(12) United States Patent
Doornsbosch

(10) Patent No.: US 6,696,674 B1
(45) Date of Patent: Feb. 24, 2004

(54) SNOW AND ICE MELTING SYSTEM

(76) Inventor: Anthony J. Doornsbosch, 424 N. Idlewild, Mundelein, IL (US) 60060

( * ) Notice: Subject to any disclaimer, the term of this patent is extended or adjusted under 35 U.S.C. 154(b) by 0 days.

(21) Appl. No.: 10/295,250

(22) Filed: Nov. 15, 2002

(51) Int. Cl.[7] ............................. H05B 3/34; H05B 3/54
(52) U.S. Cl. ................................. 219/528; 219/549
(58) Field of Search ........................ 219/528, 548, 219/549, 213, 245

(56) References Cited

U.S. PATENT DOCUMENTS

| | | | | |
|---|---|---|---|---|
| 4,581,522 A | * | 4/1986 | Graham | 219/545 |
| 4,737,618 A | * | 4/1988 | Barbier et al. | 219/548 |
| 4,833,305 A | * | 5/1989 | Mashimo et al. | 219/549 |
| 5,003,157 A | * | 3/1991 | Hargrove | 219/213 |
| 5,300,760 A | * | 4/1994 | Batiwalla et al. | 219/549 |
| 5,380,988 A | * | 1/1995 | Dyer | 219/548 |
| 5,433,050 A | * | 7/1995 | Wilson et al. | 52/302.1 |
| 5,637,247 A | * | 6/1997 | Flynn, Jr. | 219/213 |
| 5,804,799 A | * | 9/1998 | Stewart | 219/528 |
| 5,966,502 A | * | 10/1999 | Pearce | 392/465 |
| 5,998,770 A | * | 12/1999 | Sundby | 219/528 |
| 6,184,496 B1 | * | 2/2001 | Pearce | 219/213 |
| 6,294,768 B1 | * | 9/2001 | Liebich | 219/528 |

* cited by examiner

Primary Examiner—Ehud Gartenberg
Assistant Examiner—L. Fastovsky

(57) ABSTRACT

A snow and ice melting system for deicing vehicles having a resistive heating element and a heating layer encasing the resistive heating element. The heating layer is capable of conducting heat and is pliable. A heat dissipation mesh is encased in a heat dissipation layer. The heat dissipation layer is connected to the heating layer. The heat dissipation layer is capable of conducting heat and is pliable.

20 Claims, 5 Drawing Sheets

SNOW AND ICE MELTING SYSTEM

BACKGROUND OF THE INVENTION

1. Field of the Invention

The present invention relates to a snow and ice melting system for use in connection with vehicle windshield apparatus. The snow and ice melting system has particular utility in connection with snow and ice melting system which has a soft surface for contacting the vehicle and a water resistant surface.

2. Description of the Prior Art

Snow and ice melting systems are desirable for quickly deicing cars in snow states. The devices are used to reduce the amount of time a driver has to spend clearing windows before a vehicle can be safely driven after it has been snowed or sleeted on. A need was felt for a deicing blanket that could be placed upon the ice and snow to melt it and that would have a soft surface so that the vehicle would not be scratched.

The use of vehicle windshield apparatus is known in the prior art. For example, U.S. Pat. No. 5,804,799 to Stewart discloses a snow and ice melting system including a foldable heating cover dimensioned for covering a vehicle. A storage cart is dimensioned for receiving the heating cover in a folded configuration. A pair of cooperating cords are disposed within the storage cart. The pair of cooperating cords are in electrical communication with each other. The pair of cooperating cords include a first cord and a second cord. The first cord has a free end coupled with the heating cover. The second cord has a free end coupleable with an electrical outlet. However, the Stewart '799 patent does not have a rubber encased heating layer, an encased metal mesh heat dissipation layer and a felt surface protection layer.

Similarly, U.S. Pat. No. 5,160,827 to Parker discloses an automotive windshield de-ice apparatus that is a flexible sheet member is mounted to an interior surface of a vehicular windshield, with the sheet member including a serpentine resistance heater directed therethrough in electrical communication with the associated vehicle. A rheostat effects selective heating in the resistance element. Further, a modification of the invention includes directional air conduits mounted to an interior surface of the sheet member to direct heated air within the passenger compartment, wherein the tubes include conduits, and the conduits each selectively mount a cap member at an upper terminal end thereof, wherein each cap member includes a pivotally mounted directing tube to selectively direct heated air throughout the vehicular passenger compartment. However, the Parker '827 patent does not have a rubber encased heating layer, an encased metal mesh heat dissipation layer and a felt surface protection layer.

Lastly, U.S. Pat. No. 3,636,311 to Steger discloses a heating device for vehicle windows for deicing, defrosting or de-misting purposes. The device comprises a sheet of flexible transparent material and means, such as an adhesive border, for attaching to the vehicle window. An electrical resistance heating element in the form of a layer of electrically conducting material, formed for example from metallic particles carried in a binder, is bonded to the surfaces of the sheet. However, the Steger '311 patent does not have a rubber encased heating layer, an encased metal mesh heat dissipation layer and a felt surface protection layer.

While the above-described devices fulfill their respective, particular objectives and requirements, the aforementioned patents do not describe a snow and ice melting system that allows snow and ice melting system which has a felt surface for contacting the vehicle and a water resistant surface. The Stewart '799, Parker '827 and Steger '311 patents make no provision for a rubber encased heating layer, a coated metal mesh heat dissipation layer and a felt surface protection layer.

Therefore, a need exists for a new and improved snow and ice melting system which can be used for snow and ice melting system which has a felt surface for contacting the vehicle and a water resistant surface. In this regard, the present invention substantially fulfills this need.

In this respect, the snow and ice melting system according to the present invention substantially departs from the conventional concepts and designs of the prior art, and in doing so provides an apparatus primarily developed for the purpose of snow and ice melting system which has a felt surface for contacting the vehicle and a water resistant surface.

SUMMARY OF THE INVENTION

In view of the foregoing disadvantages inherent in the known types of vehicle windshield apparatus now present in the prior art, the present invention provides an improved snow and ice melting system, and overcomes the above-mentioned disadvantages and drawbacks of the prior art. As such, the general purpose of the present invention, which will be described subsequently in greater detail, is to provide a new and improved snow and ice melting system and method which has all the advantages of the prior art mentioned heretofore and many novel features that result in a snow and ice melting system which is not anticipated, rendered obvious, suggested, or even implied by the prior art, either alone or in any combination thereof.

To attain this, the present invention essentially comprises a resistive heating element and a heating layer encasing the resistive heating element. The heating layer is capable of conducting heat and is pliable. A heat dissipation mesh encased in a heat dissipation layer. The heat dissipation layer is connected to the heating layer. The heat dissipation layer is capable of conducting heat and is pliable.

There has thus been outlined, rather broadly, the more important features of the invention in order that the detailed description thereof that follows may be better understood and in order that the present contribution to the art may be better appreciated.

The invention may also include a finish protection layer, a waterproof layer, a power connection, a cigarette lighter power cord and a power transformer. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved snow and ice melting system that has all of the advantages of the prior art vehicle windshield apparatus and none of the disadvantages.

It is another object of the present invention to provide a new and improved snow and ice melting system that may be easily and efficiently manufactured and marketed.

An even further object of the present invention is to provide a new and improved snow and ice melting system that has a low cost of manufacture with regard to both materials and labor, and which accordingly is then susceptible of low prices of sale to the consuming public, thereby making such snow and ice melting system economically available to the buying public.

Still another object of the present invention is to provide a new snow and ice melting system that provides in the apparatuses and methods of the prior art some of the advantages thereof, while simultaneously overcoming some of the disadvantages normally associated therewith.

Even still another object of the present invention is to provide a snow and ice melting system for snow and ice melting system which has a felt finish protection layer for contacting the vehicle.

Still yet another object of the present invention is to provide a snow and ice melting system having an encased metal mesh heat dissipation layer.

Lastly, it is an object of the present invention is to provide a snow and ice melting system having a rubber encased heating layer.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
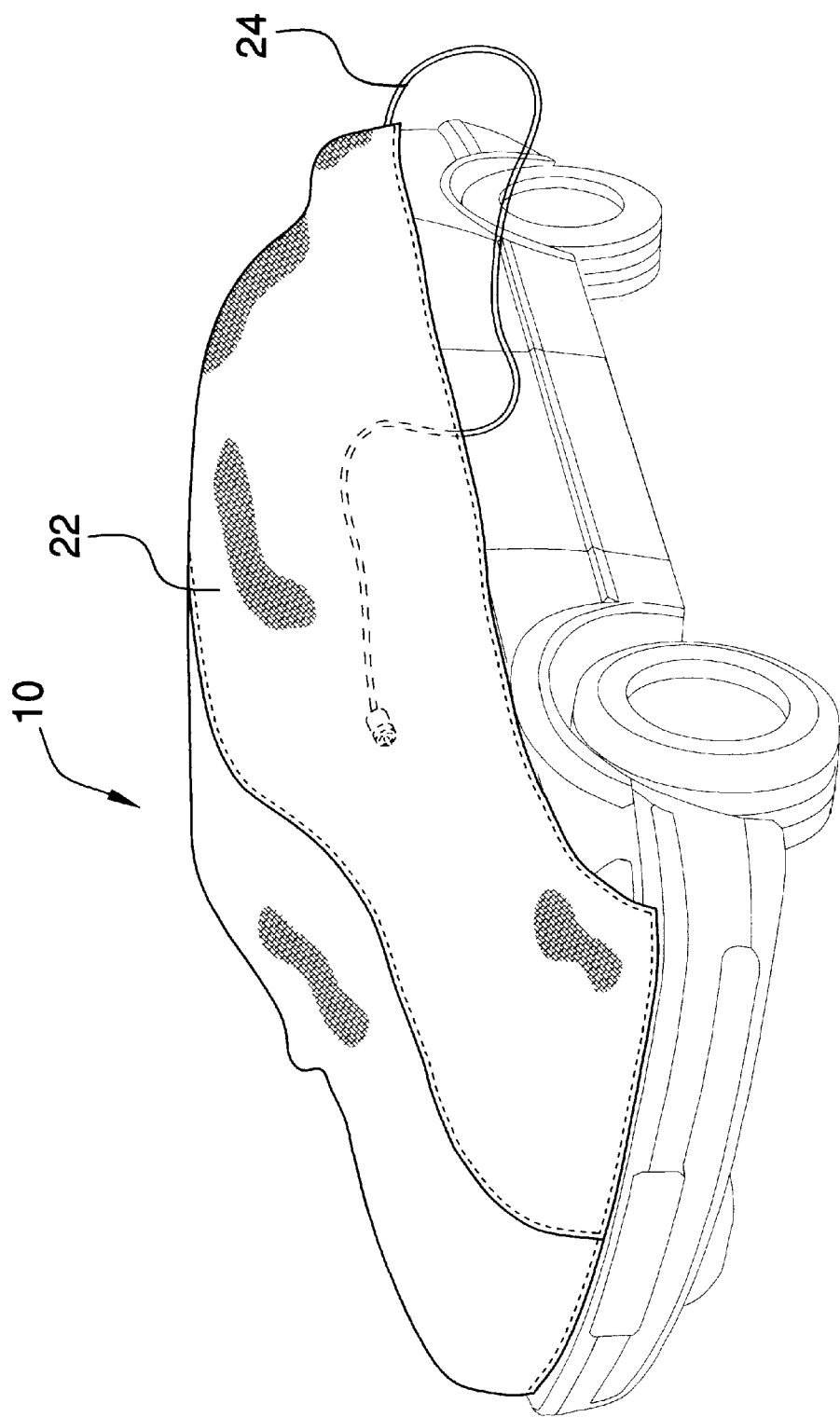
FIG. 1 is a top perspective view of the preferred embodiment of the snow and ice melting system constructed in accordance with the principles of the present invention.

Referring now to the drawings, and particularly to FIGS. 1–5, a preferred embodiment of the snow and ice melting system of the present invention is shown and generally designated by the reference numeral 10.

In FIG. 1, a new and improved snow and ice melting system 10 of the present invention for snow and ice melting system which has a felt surface for contacting the vehicle and a water resistant surface is illustrated and will be described. More particularly, the snow and ice melting system 10 has a heating layer 14 (shown in FIG. 3) that encases a resistive heating element 12 (shown in FIG. 3). In the present example the heating layer is $5/16$ of an inch thick. A waterproof layer 22 is connected to the heating layer 14 which is made of a flexible plastic. In he present example the waterproof layer is $1/4$ of an inch thick. A power connection 24 is electrically connected to the resistive heating element 12.

Figure 2:
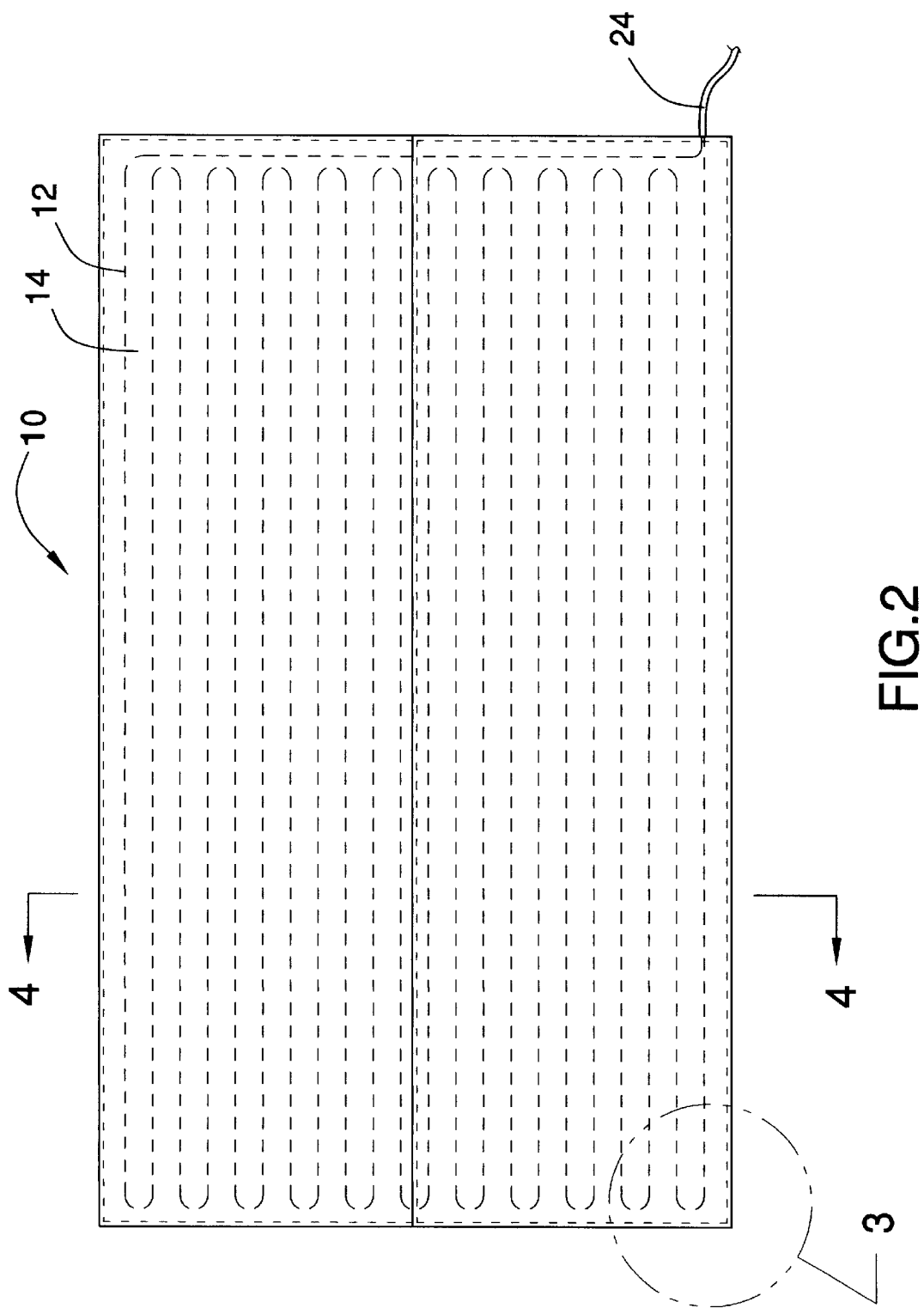
FIG. 2 is a top side view of the snow and ice melting system of the present invention.

In FIG. 2, the snow and ice melting system 10 is illustrated and will be described. The snow and ice melting system 10 has the heating layer 14 that encases the resistive heating element 12. The power connection 24 is electrically connected to the resistive heating element 12.

Figure 3:
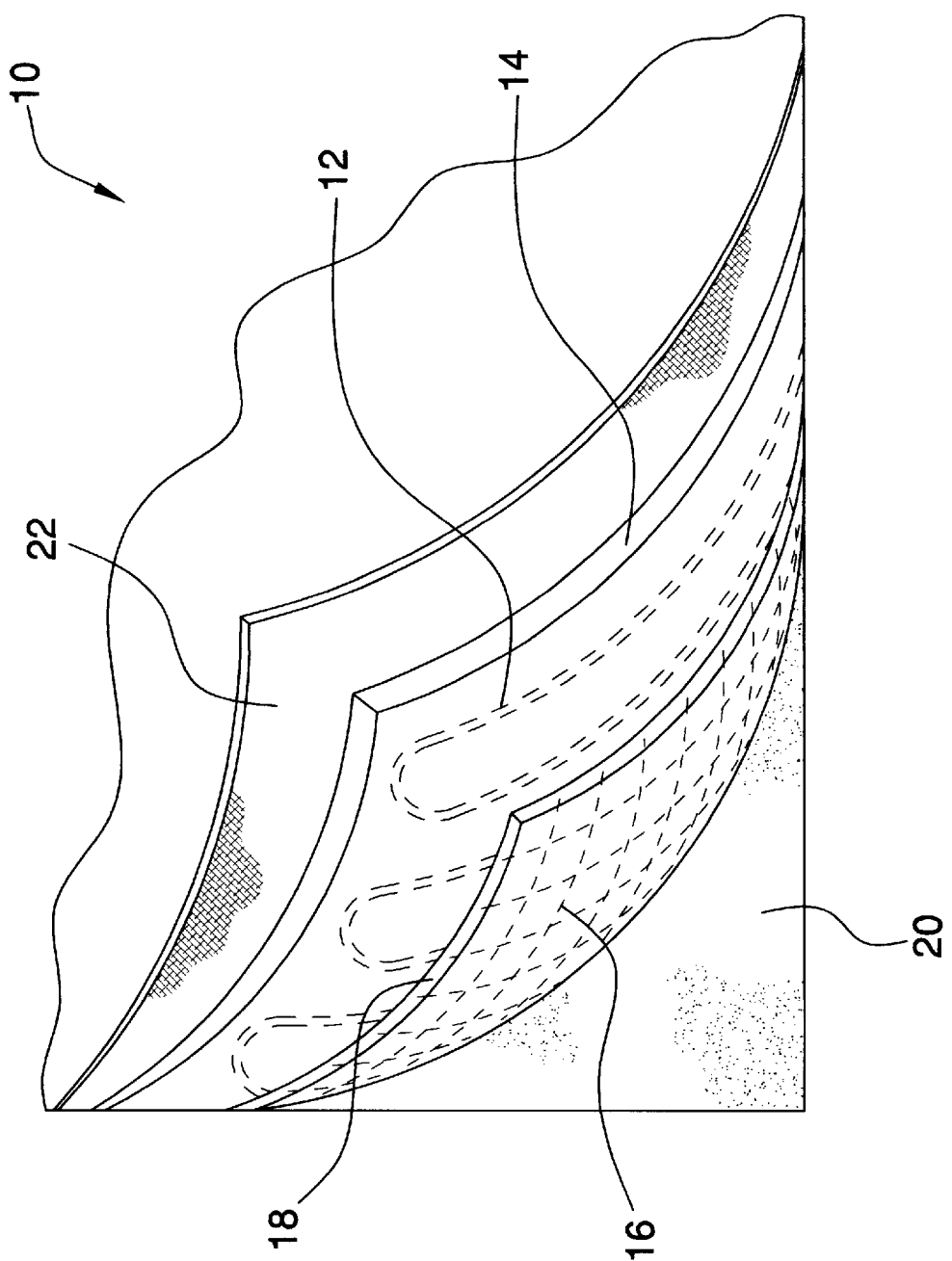
FIG. 3 is a section 3 view of FIG. 2 of the snow and ice melting system of the present invention.

In FIG. 3, the snow and ice melting system 10 is illustrated and will be described. The snow and ice melting system 10 has the heating layer 14 that encases the resistive heating element 12. The heating layer 14 is capable of conducting heat. The heating layer 14 is pliable. The heating layer 14 is comprised of rubber. A heat dissipation mesh 16 is comprised of metal. A heat dissipation layer 18 is connected to the heating layer 14. The heat dissipation layer 18 encasing the heat dissipation mesh 16. In the present example the heat dissipation layer is $3/16$ of an inch thick. The heat dissipation layer 18 is capable of conducting heat. The heat dissipation layer 18 is pliable. The heat dissipation layer 18 is comprised of rubber. A finish protection layer 20 is connected to the heat dissipation layer 18. The finish protection layer 20 is comprised of felt. The waterproof layer 22 is connected to the heating layer 14. The waterproof layer 22 is flexible. The waterproof layer 22 is comprised of plastic.

Figure 4:
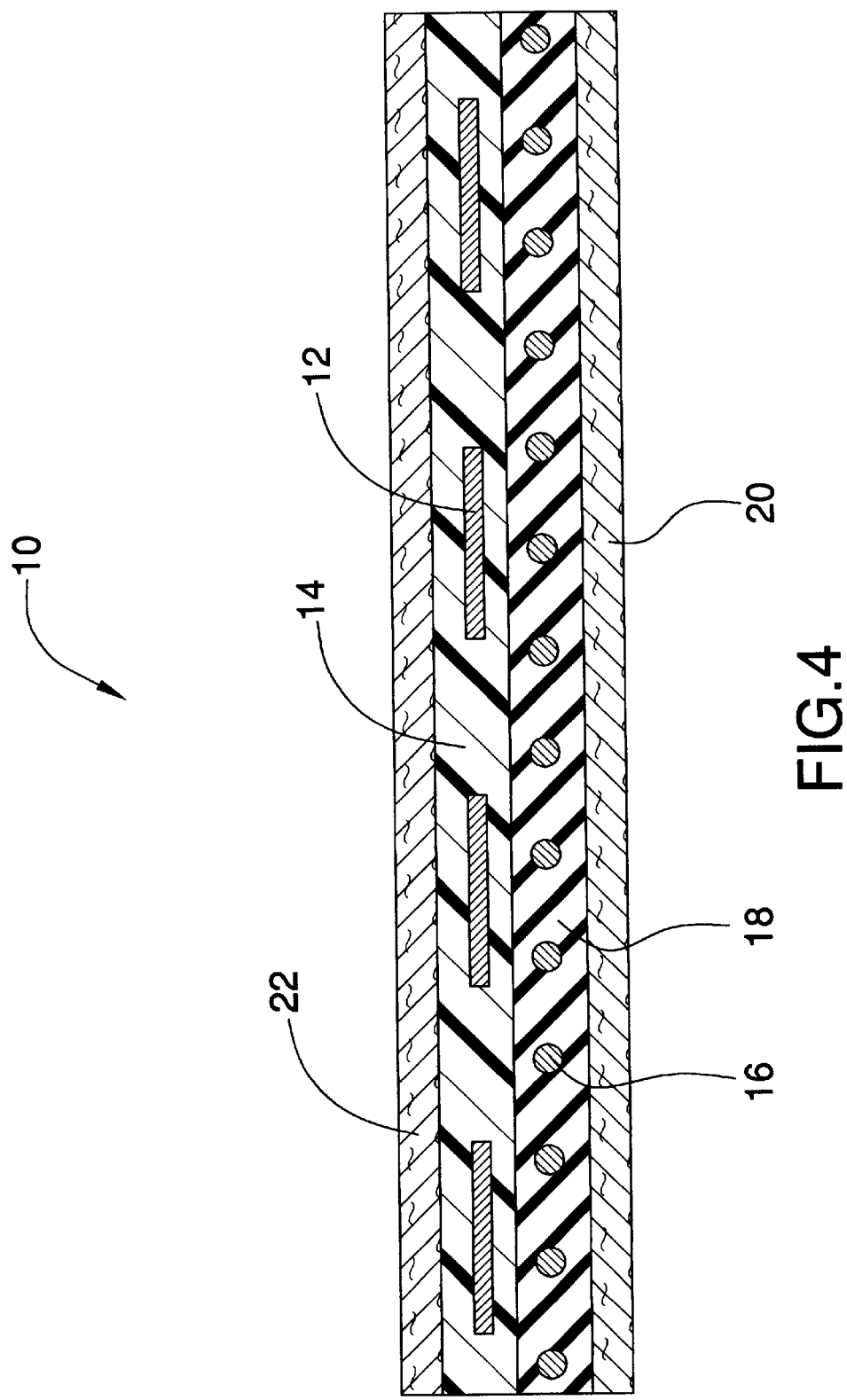
FIG. 4 is a section 4—4 view of FIG. 2 of the snow and ice melting system of the present invention.

In FIG. 4, the snow and ice melting system 10 is illustrated and will be described. The snow and ice melting system 10 has the heating layer 14 that encases the resistive heating element 12. The heating layer 14 is capable of conducting heat. The heating layer 14 is pliable. The heating layer 14 is comprised of rubber. The heat dissipation mesh 16 is comprised of metal. The heat dissipation layer 18 is connected to the heating layer 14. The heat dissipation layer 18 encasing the heat dissipation mesh 16. The heat dissipation layer 18 is capable of conducting heat. The heat dissipation layer 18 is pliable. The heat dissipation layer 18 is comprised of rubber. The finish protection layer 20 is connected to the heat dissipation layer 18. The finish protection layer 20 is comprised of felt. The waterproof layer 22 is connected to the heating layer 14. The waterproof layer 22 is flexible. The waterproof layer 22 is comprised of plastic.

Figure 5:
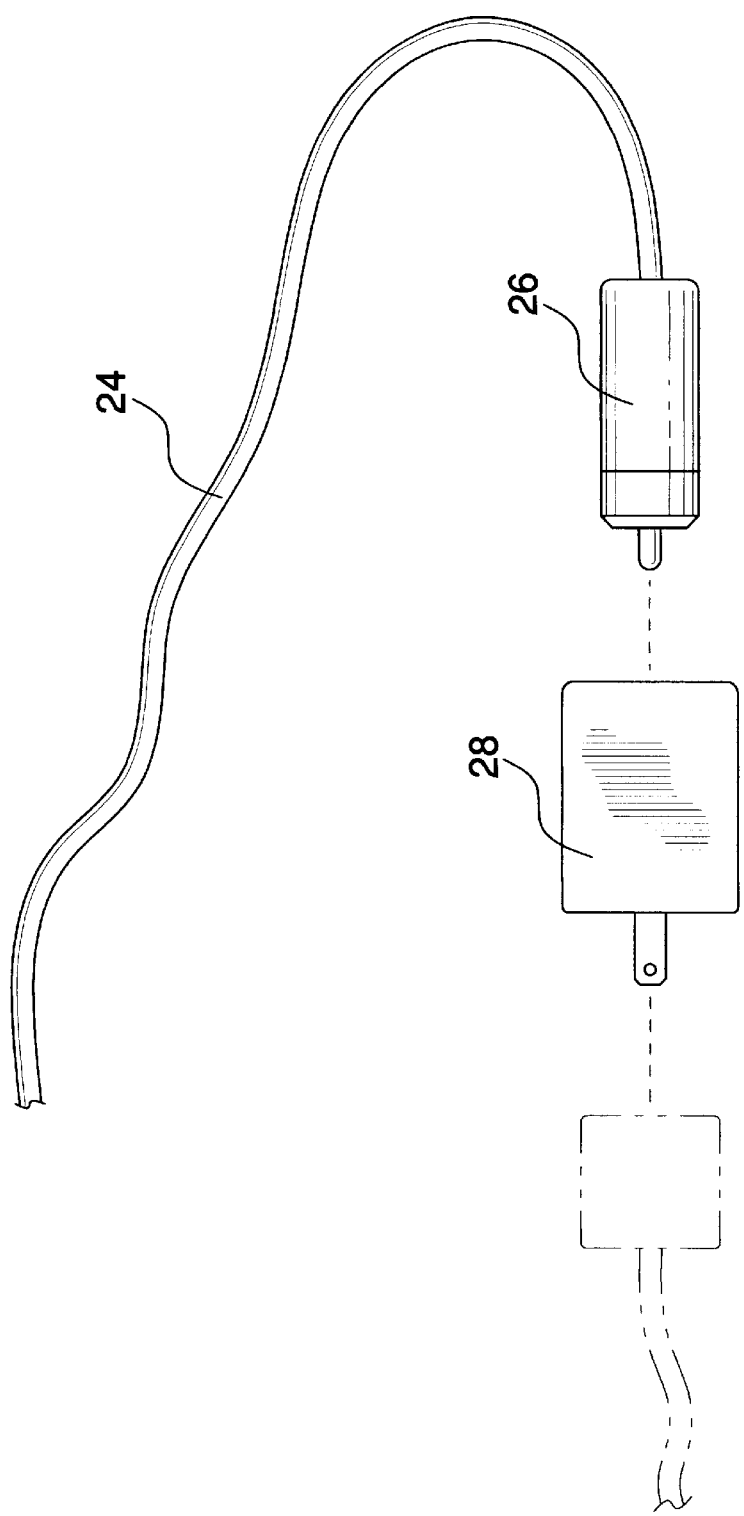
FIG. 5 is a side view of the snow and ice melting system of the present invention.

In FIG. 5, the snow and ice melting system 10 is illustrated and will be described. The power connection 24 is electrically connected to the resistive heating element 12. A cigarette lighter power plug 26 is electrically connected to the power connection 24. A power transformer 28 is electrically connectable to the cigarette lighter power plug 26.

It can now be understood that in use prior to the onset of snow, an individual could simply apply the snow and ice melting system 10 over his or her vehicle and connect the unit's plug to the vehicle's electrical system. Plugging the snow and ice melting system 10 in would activate the resistive heating element 12 to heat the unit above 32 degrees Fahrenheit thereby warming the entire cover. This would in turn melt the snow and ice preventing it from accumulating.

While a preferred embodiment of the snow and ice melting system has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable soft material such as fabric may be used instead of the felt described. Any suitable encasing material such as plastic can be used for the heating layer and thermal dissipation layer instead of the rubber described. And although snow and ice melting system which has a felt surface for contacting the vehicle and a water resistant surface have been described, it should be appreciated that the snow and ice melting system herein described is also suitable for deicing aircraft.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A snow and ice melting system comprising:
   a resistive heating element;
   a heating layer encasing said resistive heating element, said heating layer capable of conducting heat, said heating layer being pliable;
   a heat dissipation mesh; and
   a heat dissipation layer connected to said heating layer, said heat dissipation layer encasing said heat dissipation mesh, said heat dissipation layer capable of conducting heat, said heat dissipation layer being pliable.

2. The snow and ice melting system of claim 1 further comprising:
   a finish protection layer connected to said heat dissipation layer.

3. The snow and ice melting system of claim 2 wherein: said finish protection layer being comprised of felt.

4. The snow and ice melting system of claim 1 further comprising:
   a waterproof layer connected to said heating layer, said waterproof layer being flexible.

5. The snow and ice melting system of claim 4 wherein: said waterproof layer is comprised of plastic.

6. The snow and ice melting system of claim 1 further comprising:
   a power connection electrically connected to said resistive heating element.

7. The snow and ice melting system of claim 6 further comprising:
   a cigarette lighter power plug electrically connected to said power connection.

8. The snow and ice melting system of claim 7 further comprising:
   a power transformer electrically connectable to said cigarette lighter power plug.

9. The snow and ice melting system of claim 1 wherein: said heating layer is comprised of rubber.

10. The snow and ice melting system of claim 1 wherein: said heat dissipation layer is comprised of rubber.

11. The snow and ice melting system of claim 1 wherein: said heat dissipation mesh is comprised of metal.

12. A snow and ice melting system comprising:
    a resistive heating element;
    a heating layer encasing said resistive heating element, said heating layer capable of conducting heat, said heating layer being pliable;
    a heat dissipation mesh;
    a heat dissipation layer connected to said heating layer, said heat dissipation layer encasing said heat dissipation mesh, said heat dissipation layer capable of conducting heat, said heat dissipation layer being pliable; and
    a finish protection layer connected to said heat dissipation layer.

13. The snow and ice melting system of claim 11 wherein: said finish protection layer being comprised of felt.

14. The snow and ice melting system of claim 12 further comprising:
    a waterproof layer connected to said heating layer, said waterproof layer being flexible.

15. The snow and ice melting system of claim 13 wherein: said waterproof layer is comprised of plastic.

16. The snow and ice melting system of claim 14 wherein: said heating layer is comprised of rubber; and said heat dissipation layer is comprised of rubber.

17. The snow and ice melting system of claim 16 further comprising:
    a power connection electrically connected to said resistive heating element.

18. The snow and ice melting system of claim 17 fuirther comprising:
    a cigarette lighter power plug electrically connected to said power connection.

19. The snow and ice melting system of claim 18 further comprising:
    a power transformer electrically connectable to said cigarette lighter power plug.

20. A snow and ice melting system comprising:
    a resistive heating element;
    a heating layer encasing said resistive heating element, said heating layer capable of conducting heat, said heating layer being pliable, said heating layer is comprised of rubber;
    a heat dissipation mesh, said heat dissipation mesh being comprised of metal;
    a heat dissipation layer connected to said heating layer, said heat dissipation layer encasing said heat dissipation mesh, said heat dissipation layer capable of conducting heat, said heat dissipation layer being pliable, said heat dissipation layer is comprised of rubber;

a finish protection layer connected to said heat dissipation layer said finish protection layer being comprised of felt;

a waterproof layer connected to said heating layer, said waterproof layer being flexible, said waterproof layer is comprised of plastic;

a power connection electrically connected to said resistive heating element;

a cigarette lighter power plug electrically connected to said power connection; and a power transformer electrically connectable to said cigarette lighter power plug.

* * * * *